United States Patent
Chang et al.

(10) Patent No.: US 11,902,490 B2
(45) Date of Patent: Feb. 13, 2024

(54) METHODS AND SYSTEM FOR INK LIMIT ADJUSTMENTS TO ICC PROFILES FOR COLOR PRINTING

(71) Applicant: Kyocera Document Solutions Inc., Osaka (JP)

(72) Inventors: Michael M. Chang, Redondo Beach, CA (US); Javier A. Morales, Rochester, NY (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 343 days.

(21) Appl. No.: 17/314,436

(22) Filed: May 7, 2021

(65) Prior Publication Data
US 2022/0360687 A1 Nov. 10, 2022

(51) Int. Cl.
*H04N 1/60* (2006.01)
*G06K 15/02* (2006.01)

(52) U.S. Cl.
CPC ......... *H04N 1/605* (2013.01); *G06K 15/1802* (2013.01); *H04N 1/6097* (2013.01)

(58) Field of Classification Search
CPC ... H04N 1/605; H04N 1/6097; G06K 15/1802
See application file for complete search history.

(56) References Cited

U.S. PATENT DOCUMENTS

| | | | |
|---|---|---|---|
| 2003/0132984 A1* | 7/2003 | Maltz | H04N 1/6058 347/19 |
| 2013/0148140 A1* | 6/2013 | Bateman-Jones | G06K 15/1822 358/1.9 |

* cited by examiner

*Primary Examiner* — Christopher Wait
(74) *Attorney, Agent, or Firm* — Millen, White, Zelano & Branigan, P.C.; William F. Nixon

(57) ABSTRACT

A color printing system manages ICC profiles by controlling ink use without performing the ICC profile creation operations. To obtain an ink limit for an ICC profile, a table associated with the ICC profile is parsed to determine the ink limit. The ink limit is decreased or increased. For an ink limit decrease, a color over the decreased ink limit is adjusted to meet the new ink limit. The ICC profile is updated accordingly. For an ink limit increase, the combination of primary colors are boosted by a percentage amount. Checks are made with regard to the volume-based ink limit and an quality check operation to accepted the boosted amount. The ICC profile is updated accordingly.

8 Claims, 8 Drawing Sheets

METHODS AND SYSTEM FOR INK LIMIT ADJUSTMENTS TO ICC PROFILES FOR COLOR PRINTING

FIELD OF THE INVENTION

The present invention relates to making adjustments for ink limits to existing ICC profiles at a printing device.

DESCRIPTION OF THE RELATED ART

Color management is one of the more complex aspects of color printing. Two operations may be performed for production print color management, calibration and ICC profile creation. In color management, an ICC profile is a set of data that characterizes a color input or output device, or a color space, according to standards promulgated by the International Color Consortium (ICC). Calibration provides a stable foundation on which ICC profiling can be implemented. Calibration may be relatively straight-forward as opposed to ICC profile creation. Calibration linearizes color printing device response so that individual color ramps, or colors in 10% increments (from 10%-100%) are evident. A quality check also may be performed to verify color stability.

There may be downsides to these operations. Color management tasks require both time and expertise that result in high quality outputs. Customers in print shops, however, may not need such quality for their print jobs. Further, the time and operator expertise to perform these tasks means additional costs that are problematic for print shops that are not focused on high quality output.

SUMMARY OF THE INVENTION

A method for managing an ICC profile is disclosed. The method includes accessing the ICC profile at a printing device. The method also includes parsing at least one table associated with the ICC profile to determine an ink limit for plurality of primary colors in the ICC profile. The method also includes decreasing the ink limit corresponding to the ICC profile. The method also includes adjusting a first color of the plurality of primary colors in the ICC profile that is over the decreased ink limit to meet the decreased ink limit. The method also includes updating the ICC profile with the first color. The method also includes saving the updated ICC profile at the printing device.

A method of managing an ICC profile is disclosed. The method includes accessing the ICC profile at a printing device. The method also includes parsing at least one table associated with the ICC profile to determine an ink limit for a plurality of output colors in the ICC profile. Each of the plurality of output colors is comprised of primary colors. The method also includes increasing the ink limit corresponding to the ICC profile. The method also includes boosting each of the primary colors of a combination of primary colors by a percentage amount. The method also includes determining if the total percentage amount of the combination of primary colors exceeds a volume-based ink limit. The method also includes, if the volume-based ink limit is exceeded, adjusting the total percentage amount of the combination of primary colors to meet the volume-based ink limit. The method also includes, if the volume-based ink limit is not exceeded, accepting the total percentage amount of the combination of primary colors. The method also includes updating the ICC profile according to the total percentage amount for the combination of primary colors for the respective output color. The method also includes saving the ICC profile at the printing device.

A method for managing an ICC profile for color printing operations is disclosed. The method includes selecting the ICC profile for a plurality of output colors having a first ink limit stored at a printing device. Each of the plurality of output colors is a combination of primary colors. The method also includes boosting each of the primary colors of the combination of primary colors for an output color by a percentage amount. The method also includes determining the total percentage amount of the combination of primary colors exceeds a volume-based ink limit. The method also includes adjusting the total percentage amount of the combination of primary colors to meet the volume-based ink limit. The method also includes updating the ICC profile with the adjusted total percentage amount of the combination of primary colors for the output color in the ICC profile. The method also includes performing a quality check operation on the updated ICC profile.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet.

Control strip—a test color strip that also contains encoded information.

Test chart print job—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that are used as a device-independent reference.

The disclosed embodiments allow customers to control ink use without performing ICC profile creation functions, which are the most time consuming task in color printing management operations. The direct as well as effective control of ink use allows print shops to derive the cost benefits of an ICC workflow without incurring the expense required to perform proper color management. The disclosed embodiments also allow customers to boost the density and appearance of their print output without having to incur the expense of implementing proper color management or creation of additional ICC profiles.

Figure 1:
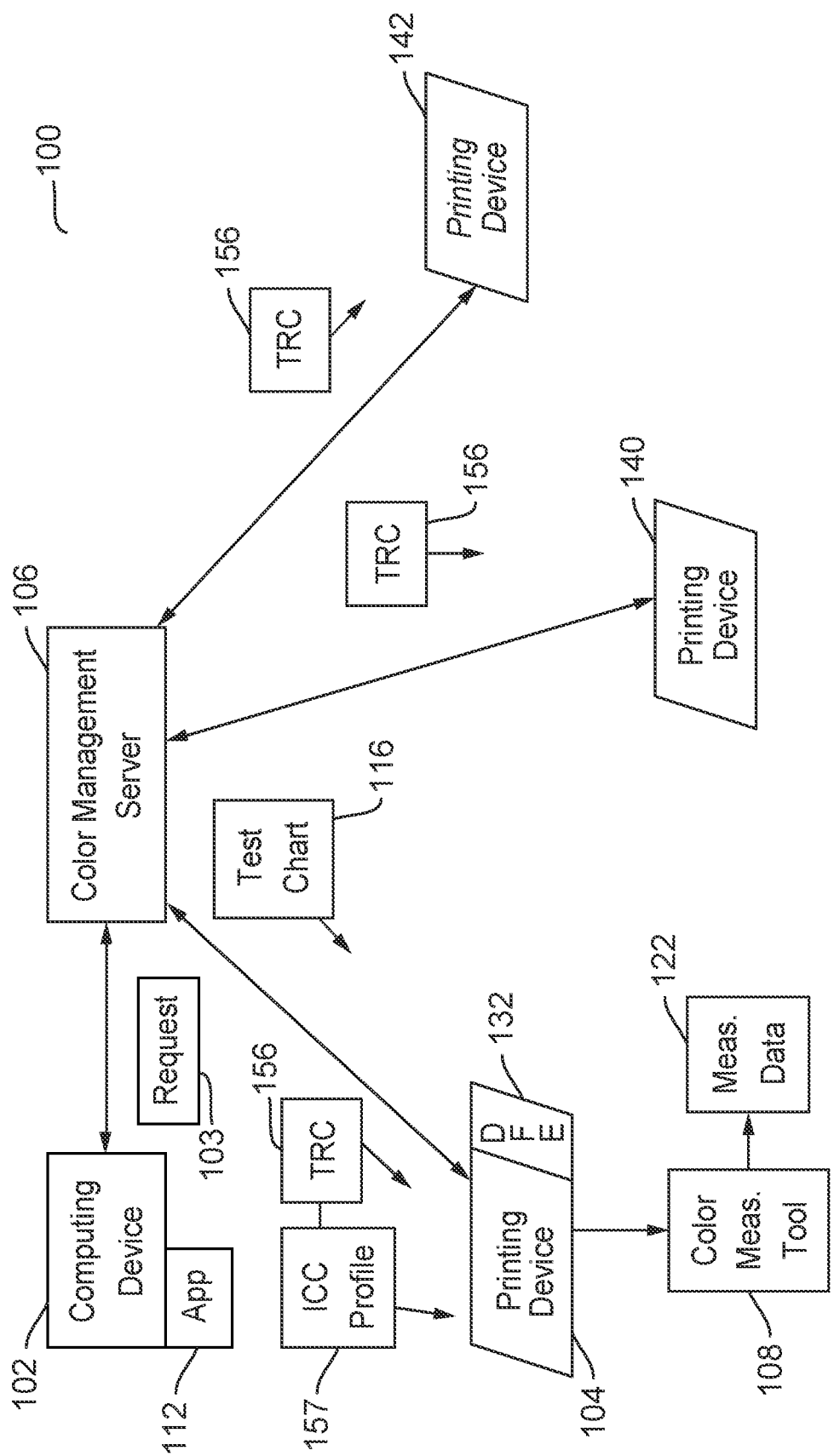
FIG. 1 illustrates a block diagram of a color management system for printing devices according to the disclosed embodiments.

FIG. 1 depicts a color management system 100 for printing devices 104, 140, and 142 according to the disclosed embodiments. Color management system 100 includes a color management server 106. Color management server 106 may be a server that registers all printing devices within system 100 and controls color management operations for the printing devices. In some embodiments, color management system 100 may be a system or network within a print shop having several or more printing devices.

Printing devices 104, 140, and 142 may receive print jobs from other devices within system 100. They also may receive calibration print jobs and quality checks from color management server 106. Test chart 116 may be generated to perform calibrations, disclosed in greater detail below. Other items and data files may be sent to printing devices 104, 140, and 142. Further, the printing devices may provide data and information to color management server 106 so that it may manage color printing operations within system 100.

In some embodiments, computing device 102 may include an application 112 that generates data for printing that is sent to color management server 106. Color management server 106 also may exchange data with printing device 104 for performing calibration operations, specifically color calibration. Color management server 106 is a server that manages print jobs and tasks between a plurality of printing devices 104, 140, and 142. Color management server 106 also provides calibration operations to the printing devices. An operator may perform calibration tasks for the plurality of printing devices using color management server 106 using computing device 102. In some embodiments, computing device 102 is incorporated with color management server 106.

Preferably, color management server 106 allows for inspection, calibration, and profiling for management of color print jobs. Color management server 106 may act as a software as a service (SaaS) solution that provides color management. The service enables repeatable color reproduction at the printing devices. Color management server 106 also may manage digital front ends (DFEs) from production printing which include paper catalogs. These paper catalogs may include paper measurements and paper color measurement profiles. For example, printing device 104 includes DFE 132.

In some embodiments, an operator may request calibration for printing device 104 within system 100. The user may utilize application 112 on computing device 102 to generate calibration request 103 for printing device 104. Calibration request 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches. Thus, the user may generate and send a large number of requests for calibrations of these different types of papers at once.

Color management server 106 receives calibration request 103 within system 100. Color management server 106 generates a test chart 116 to obtain measurement data for the paper at printing device 104. Test chart 116 includes color patches used to perform calibration operations. Test charts 116 may use colorant ramps for each colorant. Test chart 116 is forwarded to printing device 104, which prints it out on the indicated paper/media type. An operator takes test chart 116. The operator may use color measurement tool 108 to measure the color patches on test chart 116 to obtain measurement data 122. Alternatively, printing device 104 may include inline measurement tools that automatically measure the color patches within test chart 116.

The operator or printing device measures calibration chart 116 after it is printed out at the printing device. Measurement data 122 is captured by measuring the color patches and the printed colors associated therewith. The data is provided back to color management server 106 for analysis. Using the measured data, color management server 106 generates calibration tone reproduction curves (TRCs) 156 using calibration settings that may be set by the operator or system 100. Calibration settings may include end point targets and aims for the colors. Once the calibration TRCs 156 are created, they are downloaded to the printing device or devices. Alternatively, if calibration is implemented at the printing device, then calibration TRCs 156 may be stored in digital front end (DFB) 132. In some embodiment, a TRC 156 may be stored in multiple printing devices within system 100. Calibration TRCs 156 also may be associated with ICC profile 157 that is sent to printing device 104. ICC profile 157 may be built upon calibrated output such as measurement data 122. ICC profile creation is disclosed in greater detail below.

Figure 2:
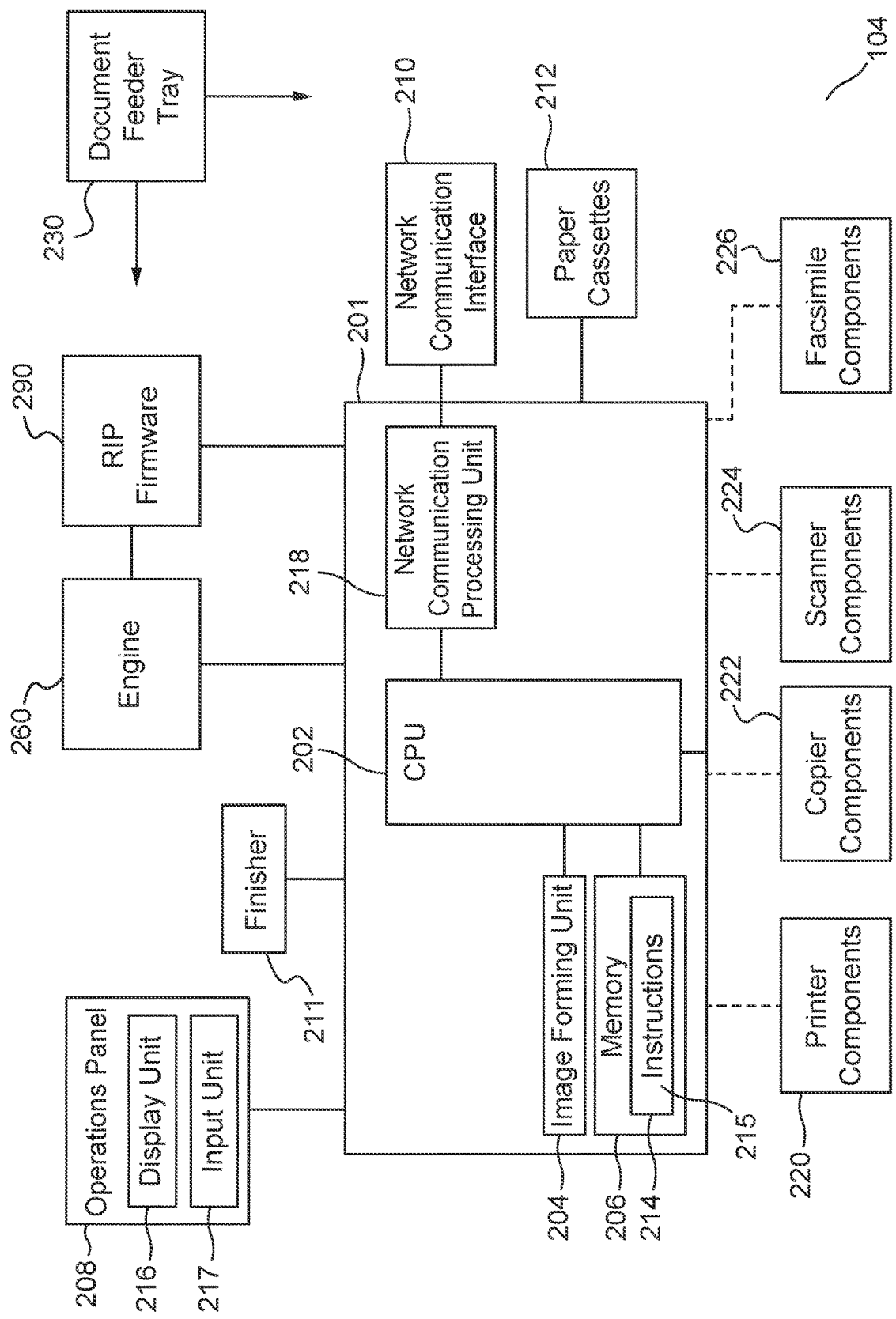
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management server 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EE-PROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with color management server 106 via network communication interface 210 by utilizing a network protocol, such as the ones listed above. In some embodiments, printing device 104 communicates with color management server 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management server 106.

In certain state-of-the-art inkjet printing devices, such as printing device 104, the ink formulations are so novel that they require a physical ink limit when used with certain media types, or paper. For these printing devices, each of the colorants may use different amounts of ink. An example of this requirement is an ink limit in terms of the maximum total ink value allowed, measured in pL.

A fundamental setting is the ink limit. Each media type has a physical limit of how much ink it can hold without physical issues, such as soak through and excessive curling, or imaging concerns, such as loss of details and smearing. Typically, an ink limit is specified in terms of the percentage of total area coverage (TAC), as disclosed above. For CMYK printing devices, the contribution of each colorant ranges from 0% to 100% ink. For any and all CMYK combinations that make a color, contribution of each ink is summed up at the TAC. Typical ink limits may be from 250% to just over 300% TAC.

Using industry standard percentage TAC ink limits may cause problems with these types of printing devices. For example, the operator may choose a percentage TAC that is low enough to ensure that all colors are within the volume ink limit. Selection of a low percentage TAC may be an issue because the resulting gamut will be smaller than what the printing device can reproduce. Alternatively, the operator may choose a percentage TAC that is high enough to ensure that it covers all colors that printing device 104 can reproduce. This selection may cause problems because certain colors may exceed the volume-based ink limits. Print jobs using these colors may cause the ink to run, thereby negatively impacting image quality and potentially contaminating the print path. Note that conventional ICC profile creation software tools all support only the percentage TAC as a specification of an ink limit.

Figure 3:
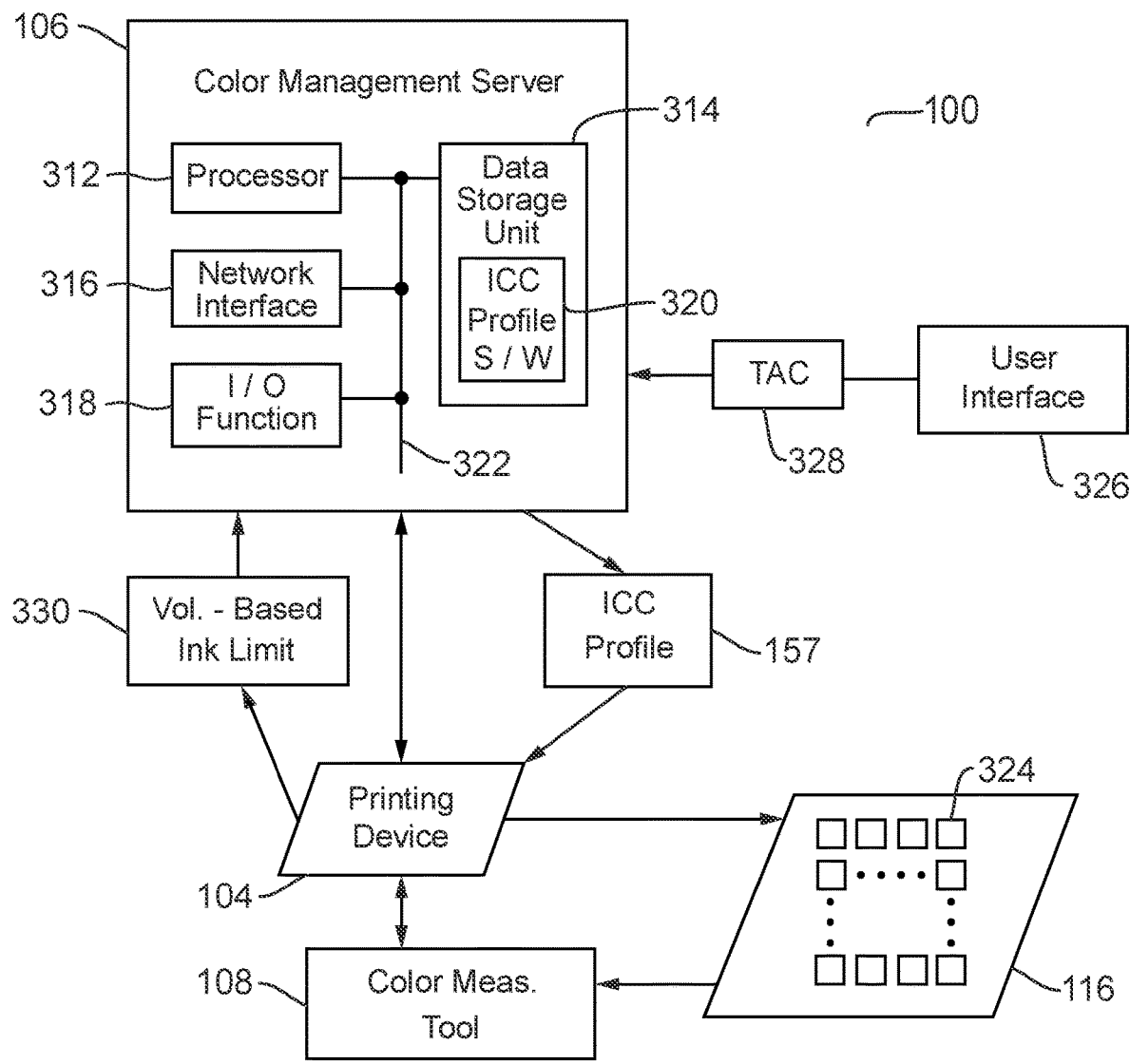
FIG. 3 illustrates a block diagram of the creation of an ICC profile at a printing device according to the disclosed embodiments.

FIG. 3 depicts a block diagram of the creation of ICC profile 157 at printing device 104 or color management server 106 according to the disclosed embodiments. System 100 of FIG. 1 is shown with emphasis on creating ICC profile 157. Color management server 106 also is shown. As disclosed above, color management server 106 may be any type of computing device capable of executing existing ICC profile maker software, such as a server, mobile phone, tablet computer, wearable computer, desktop computer, laptop computer, etc. In some embodiments, color management server 106 may operate as a part of printing device 104. For instance, color management server 106 may be located in DFB 132 and may operate the operating system of printing device 104. Thus, printing device 104 may execute the processes disclosed below. In other embodiments, color management server 106 and printing device 104 may be physically separate devices.

As shown in FIG. 3, color management server 106 includes a processor 312, data storage 314, network interface 316, and input/output function 318, all of which may be coupled by a system bus 322 or a similar mechanism. It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

Processor 312 may include one or more central processing units (CPUs), such as one or more general purpose processors and/or one or more dedicated processors (e.g., application specific integrated circuits also known as ASICs or digital signal processors also known as DSPs, etc.). Other types of processors can be used.

Data storage 314, in turn, may comprise volatile and/or non-volatile data storage and can be integrated in whole or in part with processor 312. Data storage 314 may store program instructions, executable by the processor 312, and data that are manipulated by these instructions to carry out the various methods, processes, or functions described herein. Alternatively, these methods, processes, or functions can be defined by hardware, firmware, and/or any combination of hardware, firmware and software. Therefore, data storage 314 may include a tangible, non-transitory computer-readable medium, having stored thereon program instructions that, upon execution by one or more processors, cause color management server 106 to carry out any of the methods, processes, or functions disclosed in this specification or the accompanying drawings.

In the embodiment shown in FIG. 3, data storage 314 may store ICC profile software 320, which can be executed by processor 312 to create and modify ICC profiles. ICC profile software 320 also may be known as the ICC profile creation tool. The ICC profile software 320 may correspond to conventional profile creation tools designed to create ICC profiles, such as ICC profile 157. In some embodiments, data storage 314 may also store one or more ICC profiles for use by one or more printing devices, such as printing device 104. The ICC profiles may be generated by the ICC profile software 320 or obtained from other computing devices through wired or wireless communication.

Network interface 316 may take the form of a wire line connection, such as an Ethernet, Token Ring, or T-carrier connection. Network interface 316 may alternatively take the form of a wireless connection, such as WiFi, BLU-ETOOTH®, or a wide-area wireless connection. However, other forms of physical layer connections and other types of standard or proprietary communication protocols may be used over network interface 316. Furthermore, network interface 316 may comprise multiple physical communication interfaces.

Input/output function 318 may facilitate user interaction with color management server 106. Input/output function 318 may comprise multiple types of input devices, such as a keyboard, a mouse, a touch screen, a microphone, or any other device that is capable of receiving input from a user. Similarly, input/output function 318 may comprise multiple types of output devices, such as a display, printer, one or more light emitting diodes (LEDs), speaker, or any other device that is capable of providing output discernible to a user. Alternatively, for example, color management server 106 may support remote access from another device, via network interface 316 or via another interface (not shown), such as an RS-132 or Universal Serial Bus (USB) port.

System 100 may enable the generation of new ICC profiles, such as the ICC profile 157. To illustrate an example ICC profile generation process, system 100 may initiate the generation of the new ICC profile by causing printing device 104 to print a test chart 116 based on a source color space, such as a cyan-magenta-yellow-black profile chart, as shown by color patches 324. Printing device 104 may print test chart 116 using a 4D-LUT ink limiter that limits the ink total of the different CMYK ink combinations making up the various color segments of test chart 116. In particular, each CMYK ink combination would be equal to or below the ink limit.

Test chart 116 can be measured by a color measurement tool 108, such as a spectrophotometer. Color measurement tool 108 may obtain color measurements of the different color segments, or color patches 324, of test chart 116, which can be used by the ICC profile software 320 to generate an initial ICC printer profile based on measurement data 122. Color management server 106 may then provide ICC profile 157 to one or more printers (e.g., printing device 104) and store ICC profile 157 at data storage unit 314.

Figure 4A:
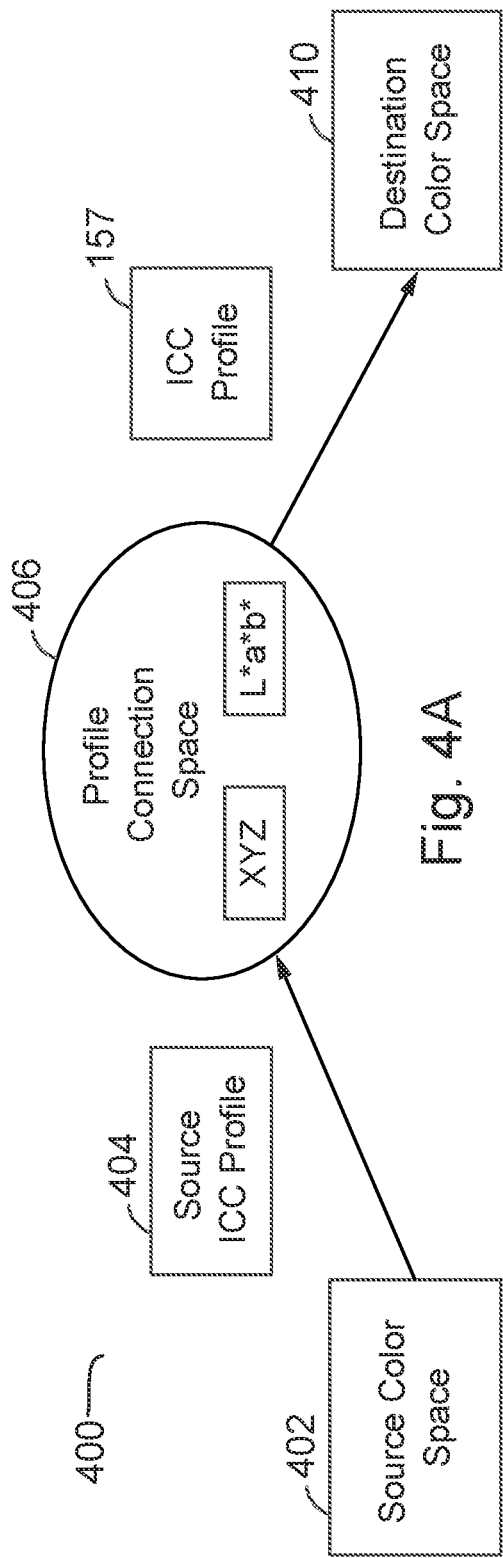
FIG. 4A illustrates a color conversion system for use with the color management system according to the disclosed embodiments.

FIG. 4A illustrates a color conversion system 400 for use with system 100 according to the disclosed embodiments. Color conversion system 400 represents a managed color workflow that offers color consistency and predictability during color conversion. As shown in FIG. 4A, color conversion system 400 includes a source color space 402, a source ICC profile 404, a profile connection space (PCS) 406, ICC profile 157, and a destination color space 410. Color conversion system 400 may be implemented on color management server 106 or printing device 104.

Color conversion system 400 may be used for color conversion from a source color space 402, or colors associated with a print job, to destination color space 410, or CMYK ink combinations that a printing device can print. Color conversion system 400 may involve initially obtaining the source color space 402, which may represent colors used by a source device (e.g., a computer monitor, a scanner). Some examples of the source color space can include an RGB color space, a CMYK color space, and a CMYKOGV color space.

Color conversion system 400 further involves identifying a source ICC profile 404 that corresponds to source color space 402. Source ICC profile 404 may provide a mapping for colors within source color space 402 to PCS 406. For example, source ICC profile 404 may store one or more LUTs that can be used to map source color space 402 to the L*a*b* color space or to the XYZ color space for PCS 406. Alternatively, source ICC profile 404 can include one or more equations for mapping source color space 402 to the L*a*b* color space or to the XYZ color space for PCS 406.

PCS 406 can serve as the interface which provides an unambiguous connection between input profiles, such as source ICC profile 404, and output profiles, such as ICC profile 157 within color conversion system 400. PCS 406 can allow the profile transforms for input, display, and output devices to be decoupled so that they can be produced independently. As such, PCS 406 can serve as the virtual destination for input transforms and the virtual source for output transforms. When the input and output transforms are based on the same PCS definition, even though they are created independently, the input and output transforms can be paired arbitrarily at run time by a color-management module (CMM), such color conversion system 400, and will yield consistent and predictable results when applied to color values.

ICC profile 157 may enable mapping colors from PCS 406 to destination color space 410. In particular, ICC profile 157 may provide a mapping for colors within PCS 406 to destination color space 410. For example, ICC profile 157 may store one or more LUTs that can be used to map input colors from PCS 406, or the L*a*b* color space, to the CMYK color space associated with destination color space 410. Alternatively, ICC profile 157 can include one or more equations for mapping colors from PCS 406 to destination color space 410. In some instances, the selection of ICC profile 157 may depend on the type of printing device performing the print job using destination color space 410.

Figure 4B:
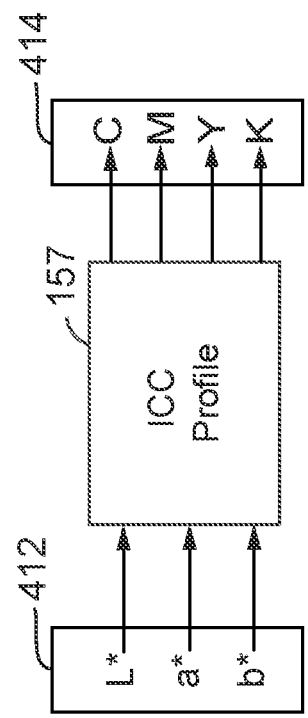
FIG. 4B further illustrates the color conversion system according to the disclosed embodiments.

FIG. 4B illustrates inputs and outputs for ICC profile 157 according to the disclosed embodiments. As shown, ICC profile 157 may represent a destination ICC profile configured to enable a device to map input L*a*b* values 412 obtained from PCS 406 shown in FIG. 4A to output CMYK values 414 used to complete the print job. For instance, ICC profile 157 can store one or more LUTs, such as a LUT for mapping colors from the L*a*b* color space to destination color space 410.

Referring to FIGS. 3, 4A, and 4B, original content with reference to device independent color is input to printing device 104. Color conversion system 400 attempts to produce a color match based on the input device independent color specification and available printing device colorants. A key piece in this workflow is the ICC profile. Source ICC profile 404 ties colors of the input content of source color space 402 to device independent measures. ICC profile 157, or destination ICC profile, provides information on how to convert the device independent input colors to printing device CMYK value 414. Thus, an important step in setting up a printing device is the creation of ICC profile 157 as the destination ICC profile. More specifically, an ICC profile 157 should be created for each specific media brand/type and model, along with the particular printing conditions.

Printing device characterization occurs with ICC profile software 320 that relates printing device CMYK quantities, in terms of their raw measurements, to device independent color values, which leads to creation of ICC profile 157. Multiple settings should be determined to process and package the printing device characterization data into an ICC profile. Settings may include the size and the precision of the conversion tables, the K colorant usage, the handling of out of gamut input colors, and the like.

As disclosed above, one setting is the ink limit. Each media type has a physical limit of how much ink it can hold. The ink limit may be specified in terms of the percentage of TAC, as disclosed above. For CMYK printing devices, the contribution of each colorant ranges from 0% to 100% ink. For any and all CMYK combinations that make a color, contribution of each ink is summed up at the TAC. Typical ink limits may be from 250% to just over 300% TAC.

Referring back to FIG. 3, a user interface 326 may be provided for all required settings to do ICC profile creation at color management server 106 or, alternatively, at printing device 104. In some embodiments, user interface 326 may be implemented on another computing device, such as computing device 102 or application 112. User interface 326 may receive input of a percentage TAC ink limit 328. The disclosed embodiments also relies on processes to combine percentage TAC ink link 328 and volume-based ink limit 330 inherent to the media type in use. Volume-based ink limit 330 may provided by printing device 104. User interface 326 may capture an input of media type for percentage TAC ink limit 328.

Figure 5A:
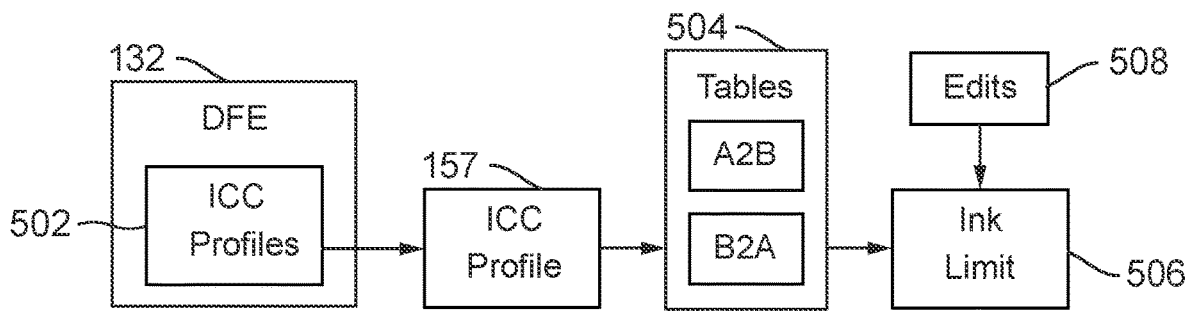
FIG. 5A illustrates a block diagram of determining an ink limit from an ICC profile according to the disclosed embodiments.

FIG. 5A depicts a block diagram of determining an ink limit 506 from ICC profile 157 according to the disclosed embodiments. DFE 132 of printing device 104 enables typical ICC profile management operations. It should be noted that printing device 104 includes the physical system shown by the components disclosed by FIG. 2 that puts ink and toner on paper. This physical system may be known as the print mechanism. The electronic system that controls data processing and storage may be known as DFE 132, or the digital front end. DFE 132, therefore, stores and manages a plurality of ICC profiles 502, which are used for color conversion for different paper media used at printing device 104.

DFE 132 provides the capability for an operator, or customer, to add, replace, and delete ICC profiles. Each of plurality of ICC profiles 502 may be added by uploading profiles created elsewhere, or stored on color management server 106. They also may be added by allowing the user to create ICC profiles by printing and measuring charts, as disclosed above.

The disclosed embodiments allow the operator to alter an ink limit 506 used to create the ICC profile. The ink limit may be set as disclosed above for ICC profile 157. Ink limit 506 corresponds to that ink limit used to generate ICC profile 157. FIG. 5A discloses how ink limit 506 may be obtained from a created ICC profile 157 of a plurality of ICC profiles 502 at DFE 132. The disclosed embodiments expose the typically hidden ICC profiles that are used as system defaults for different paper media. This feature also allows the operator to alter the ink limit that was used to create the ICC profiles.

When an operator chooses to edit the ink limits in an ICC profile, the disclosed embodiments may perform the following operations to determine ink limit 506. These operations may apply whether the ICC profile is for a specific paper media or for a paper type.

The operator opens ICC profile 157 from plurality of ICC profiles 502. The disclosed embodiment parse all destination, or B2A, tables 504 within ICC profile 157. Tables 504 may be look-up or conversion tables, as disclosed above. Tables 504 also include A2B, or source, tables, disclosed in greater detail below. The disclosed embodiments ascertain the overall ink limit, or ink limit 506, for all output colors in ICC profile 157. Ink limit 506 may represent the ink limit specified during the creation of ICC profile, as disclosed by FIG. 3.

DFE 132 or other input means receives edits 508 to adjust ink limit 506. For example, the operator may provide edits 508 to ink limit 506 obtained for ICC profile 157 via user interface 326. Ink limit 506 will be adjusted depending on various constraints and volume-based ink limit 330, as disclosed below. Any adjustments to ink limit 506 must work with the physical limits associated with volume-based ink limit 330, the paper media, or printing device 104. The operations undertaken to implement edits 508 may depend on whether ink limit 506 is being decreased or increased for ICC profile 157.

Figure 5B:
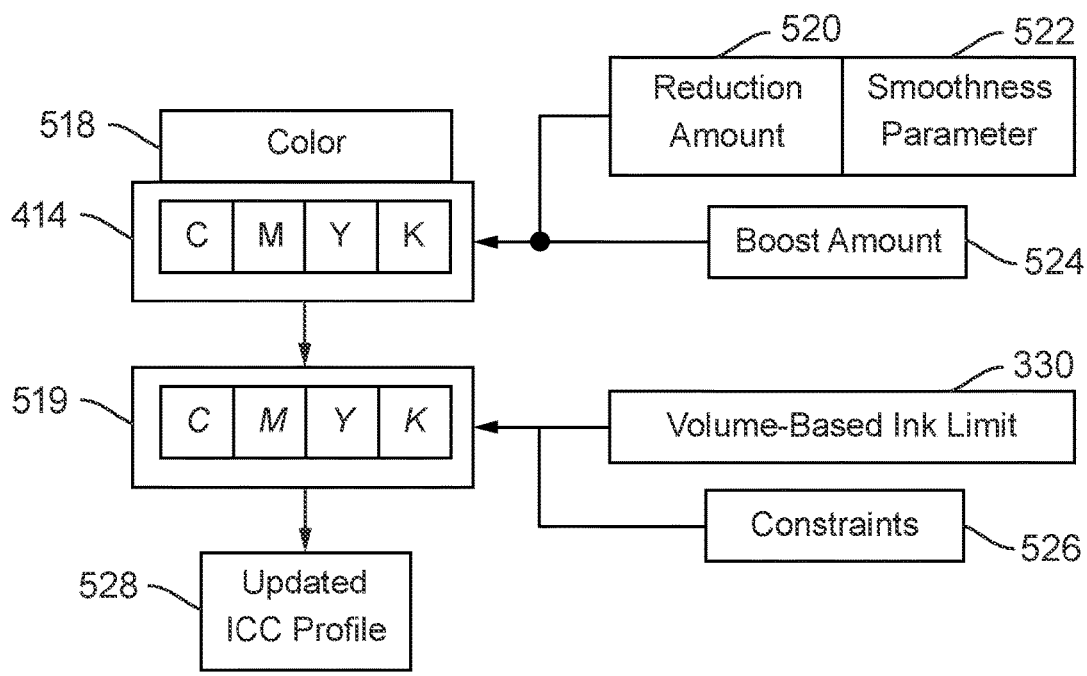
FIG. 5B illustrates a block diagram of adjusting a color based on a new ink limit according to the disclosed embodiments.

FIG. 5B depicts a block diagram of adjusting a color 518 based on a new ink limit 506 according to the disclosed embodiments. The disclosed embodiments determine whether ink limit 506 is being decreased or increased by edits 508. Which process will influence how colors managed by ICC profile 157 will be adjusted. FIG. 5B shows components for both processes.

If ink limit 506 is decreased by edits 508, then all colors are adjusted to reflect the updated ink limit. Color 518 is disclosed. Color 518 may be one of many different colors that are printed on a paper media using ICC profile 157. Each color 518 is comprised of primary colors having CMYK values 414. CMYK values 414 are generated as disclosed above.

As disclosed above, each CMYK ink combination of CMYK values 414 would be equal to or below the ink limit. It should be noted that ink limit 506 relates to percentages of each color, or total percentage amount 519. None of the primary colors can be over 100% and the combination of these percentages cannot exceed ink limit 506. After applying edits 508 to ink limit 508, the disclosed embodiments determine whether CMYK values 414 of color 518 exceed the updated ink limit. For example, if ink limit 506 is reduced from 280% to 260%, then it is determined whether total percentage amount 519 of the combination of CMYK values 414 exceeds 260%.

If so, then color 518 is adjusted to meet the updated ink limit. Thus, a reduction amount 520 may be applied to CMYK values 414. Reduction amount 520 may be a percentage of each primary color to be reduced until total percentage amount 519 of CMYK values 414 meets the updated ink limit. For example, for color 518 may have CMYK values 414 of 80%, 80%, 60%, 50%, which is a combined value of 270%. This combined value meets the old ink limit of 280% for ICC profile 157 but not the new one of 260%. Thus, a reduction amount 520 may be applied to step back the CMYK values to meet the new ink limit. Reduction amount 520 may be a percentage, such as 5% to step back the CMYK values. In this example, the CMYK values may be reduced to 76%, 76%, 57%, 47.5%, or a combination of 256.5% (which may be rounded up to 257%).

If color 518 includes CMYK values 414 that do not exceed the updated ink limit, then the disclosed embodiments also adjusts the CMYK values to proportionally reduce their ink use in order to preserve smoothness in transition. Reduction amount 520 is based on an ink limit smoothness parameter 522. Smoothness parameter 522 may be defined for ICC profile 157 based on the paper media corresponding to the color printing operations. Alternatively, smoothness parameter 522 may be defined for plurality of ICC profiles 502.

If ink limit 506 is to be increased, then color 518 is examined to explore a proper boost amount 524 in ink use. The disclosed embodiments determine if the increased ink use allowed by updated ink limit 506 for color 518 would exceed volume-based ink limit 330, disclosed above. The disclosed embodiments also check if boosting ink use would show obvious distortion of color 518 when printed. CMYK values 414 of color 518 are adjusted to increase ink use if these two criteria are acceptable. These operations are disclosed in greater detail below.

Ink limit 506 obtained from ICC profile 157 may be 200%. Edits 508 increase this value to 220%. Color 518 has CMYK values 414 of 80%, 80%, 40%, 0%, or a combination value of 200%. Boost amount 524 may be 10% based on the increased ink limit of the same value. In other embodiments, boost amount 524 may be set by the operator. Boosted CMYK values 414 for color 518, in initial computation, are 88%, 88%, 44%, 0%, or a combination value of 220%, which meets the new ink limit of 220%. Boosted CMYK values 414, however, also are compared to volume-based ink limit 330, which is the physical volume limit. If acceptable, then boosted CMYK values 414 may be saved and provided to updated ICC profile 528 that applies updated ink limit 506.

If volume-based ink limit 330 does not allow boosted CMYK values 414, then the disclosed embodiments will attenuate the boosted CMYK values per the physical volume limit. For example, a reduction amount 520 for adjusting boosted CMYK values may be applied. In this instance, the disclosed embodiments may adjust boosted CMYK values 414 for color 518 to 85%, 85%, 42%, 0%, which meets the physical volume limit as expressed by volume-based ink limit 330.

In other embodiments, boosted CMYK values 414 are analyzed to ensure none of the primary colors exceeds an ink use of 100%. For example, cyan, or C, cannot be set at 110% by the boost in ink use for values 414. For example, if color 518 originally includes CMYK values 414 of 100%, 60%, 40%, 0%, then the new ink limit of 220% may result in boosted CMYK values 110%, 66%, 44%, 0% after applying boost amount 524. As noted above, an ink use amount of 110% is not acceptable. Further, an adjusted combined CMYK value 414 of 100%, 66%, 44%, 0% is not acceptable. This CMYK combination alters the proportion of primary colors in the mix and will result in a distorted output color, or hue shift, from the original color. Due to this constraint 526, the disclosed embodiments do not adjust color 518. Instead, color 518 reverts back the original CMYK values and stored in updated ICC profile 528.

In some embodiments, if color 518 originally includes CMYK values 414 of 40%, 20%, 20%, 10%, then color 518 may be a mid-tone color. The disclosed embodiments may not boost mid-tone colors by much, if at all. Mid-tone colors may be in the middle of the tonal spectrum, neither dark nor light. Highlights also may be included here. These colors may have L*a*b values of 0-30, 30-50, 50+ in color space. An ink limit increase results in improved printed output quality by darkening shadows or giving dark colors more saturation. If the CMYK values of mid-tone and highlight colors are boosted, then all output colors will be darker, which is not an improvement. Thus, the disclosed embodiments may impose another constraint 526. The extent of boost amount 524 is dependent on the lightness of original color 518. This feature prevents lightness distortion of the original colors.

Thus, the disclosed embodiments not only enforce volume-based ink limit 330 when adjusting ICC profiles but also apply one or more constraints 526 that prevent distortion apart from ink limit 506 and the volume-based ink limit. In a sense, the disclosed embodiments may analyze the ink use value for CMYK values 414 to indicate whether the existing or new values boosted because of updated ink limit 506 violate policies or rules put in place to prevent boosts of CMYK values 414 that result in reduced quality of the color printing.

After adjustments have been made to each color 518, updated ICC profile 528 is saved at DFE 132 with plurality of ICC profiles 502. It should be noted that not every ICC profile is updated. Updated ICC profile 528 may replace existing ICC profile 157 or save as a new ICC profile with the updated B2A, or destination, values. Referring back to FIG. 4A, updated ICC profile 528 would replace ICC profile 157 in the color conversion process.

Additional operations may be performed to confirm color print quality. It may be understood that editing an existing ICC profile could produce output that is lower in quality versus the output from an ICC profile created using a printed chart and a spectrophotometer, as disclosed above. In order to set the proper expectation, the disclosed embodiments will perform an ICC profile quality check in both the original ICC profile, such as ICC profile 157, and the updated ICC profile, such as updated ICC profile 528.

Figure 5C:
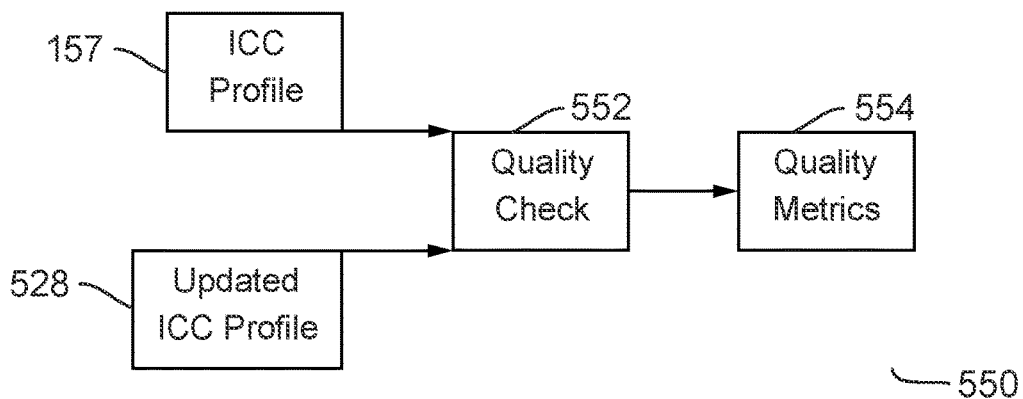
FIG. 5C illustrates a block diagram of a quality check operation for an updated ICC profile according to the disclosed embodiments.

FIG. 5C depicts a block diagram of a quality check operation 550 for updated ICC profile 528 according to the disclosed embodiments. Quality check operation 550 may be performed at printing device 104. Quality check operation 550 may be performed on an ICC profile after ink limit changes with computations based on the tables in the ICC profile for printing device 104.

As disclosed above, ICC profile 157 and updated ICC profile each may include B2A tables as part of tables 504. Tables 504 also may include A2B tables, disclosed in greater detail below, and shown in FIG. 5A. Tables 504 may be applied when one has input colors that are converted to the CMYK values applicable to printing device 104. As shown in FIG. 4A, inputs, or source color space 402, are mapped to L*a*b* values 412 as shown in profile connection space 406 and from L*a*b* values 412 to CMYK values 414 using conversions or look-ups. The latter is contained in a B2A table. Tables 504 facilitate this process.

ICC profile 157 also includes A2B tables. An A2B table contains an exhaustive sampling of CMYK quantities for printing device 104 and records the expected L*a*b* values 412 that such quantities will print. Thus, an A2B table is from CMYK to L*a*b* conversions. Specifically, the A2B1 table is measurement-based using the calibration and ICC profile creations processes disclosed above. The A2B1 table may be a reliable tool in performing quality check operation 550. It should be noted that the A2B1 table in ICC profile 157 does not change. It is identical to the A2B1 table in updated ICC profile 528.

To execute quality check 552, the disclosed embodiments compiles all changed CMYK output quantities, or combinations, in the corresponding B2A table in ICC profiles 157 and 528. For each of these changed CMYK quantities, the disclosed embodiments track the original CMYK through the A2B1 table in ICC profile 157 to determine the L*a*b* of what color it was designed to yield. The disclosed embodiments then track the changed CMYK through the same A2B1 table to get what it will provide in terms of an L*a*b* measure. This L*a*b* to L*a*b* comparison provides the difference between the "before" and "after" colors for the CMYK combination.

Printing device 104 may be ready to experience color changes given that the CMYK quantities are deliberately changed to meet the new ink limit. An ink limit decrease may result in shrinking of the color gamut boundary, or that certain colors get lighter and less saturated. On the other hand, with an ink limit increase, the disclosed embodiments want to see darker and more saturated shadow colors. It should be noted that, especially with the ink quantity boost, the disclosed embodiments are mindful not to upset the colorants' proportions nor to make mid-tone or highlights too dark.

When quality check 552 compares the before and after L*a*b* values, the disclosed embodiments will not get too concerned with overall color changes. Instead, the disclosed embodiments focus on a particular quality metric 554 that is tied to an obvious loss of color quality, which may be the hue shift. The disclosed embodiments calculate, from the before and after L*a*b* values, the change in hue of this particular color, or quality metric 554. Then, using metrics and thresholds, the disclosed embodiments may present the predicted visibility of such hue shifts to the customer or operator, along with recommendations regarding acceptable quality. The change in color may accepted after completing quality check operation 550.

Quality check operation 550 helps analyze carefully controlled boosts to ink limit 506. The boosts is controlled in order to minimize distortion to output colors. A boost that results in distortion of one or more output color may be further adjusted to prevent glitches. In some embodiments, quality check operation 550 is performed for any edits 508 to existing ICC profile 157. If ink limit 506 is decreased or increased, then printing device 104 will perform quality check operation 550. In other embodiments, quality check operation 550 may be performed only to check when boosts are done to meet increased ink limits.

An advantage of the disclosed processes is that the operator does not need to perform extensive or time-consuming color management in order to control the amount of ink that is used for color print jobs. For customers that struggle with color management, the features disclosed above remove barriers to enabling ink use control by trading off the best possible quality for quality that is not as good but is nonetheless acceptable to a given customer. The lowered ink use may allow print shops to offer different price points to their customers without requiring any sort of extensive color management. Further, ink limits may be adjusted on a case by cases, or for different paper media. A print shop may offer different price points using ink limits. It also may adjust ink limits as technology changes to allow the printing device and paper to receive more ink. Ink limits are not locked in stone until a new total ICC profile creation process is performed.

Figure 6:
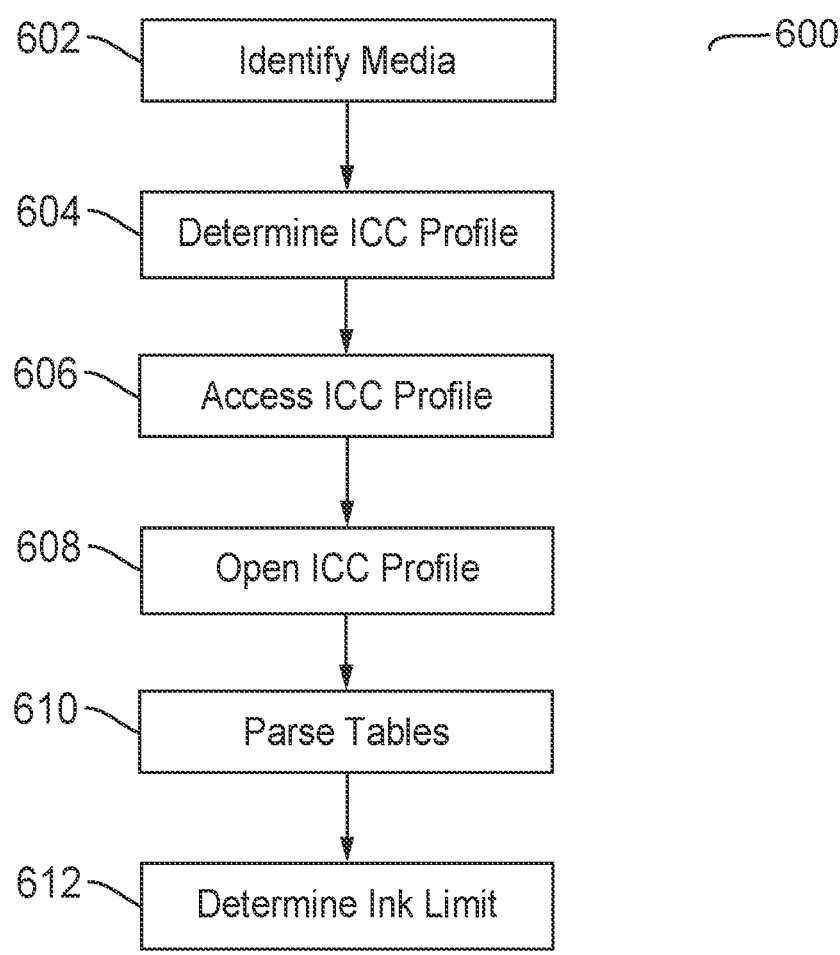
FIG. 6 illustrates a flowchart for determining an ink limit for an ICC profile stored on a printing device according to the disclosed embodiments.

FIG. 6 depicts a flowchart 600 for determining an ink limit 506 for an ICC profile 157 stored on a printing device 104 according to the disclosed embodiments. Flowchart 600 refers to FIGS. 1-5C for illustrative purposes. Flowchart 600, however, is not limited by FIGS. 1-5C.

Step 602 executes by identifying a media, such as a paper media, to change color management. Part of the change may be editing the ink limit for the media. Thus, one or more ICC profiles associated with the media also are identified based on the media. Step 604 executes by determining ICC profile 157 from plurality of ICC profiles 502. Plurality of ICC profiles 502 are stored on DFE 132 of printing device 104. An operator can select ICC profile 157 directly and through the identified media.

Step 606 executes by accessing ICC profile 157. ICC profile 157 may be accessed at printing device 104 or through another device connected to the printing device within system 100. Step 608 executes by opening ICC profile 157. Step 610 executes by parsing tables 504 in ICC profile 157. Look-up tables 504 are parsed for color printing conversion information based on the colors associated with the tables. Step 612 executes by determining ink limit 506 for ICC profile 157 using the parsed information.

Figure 7:
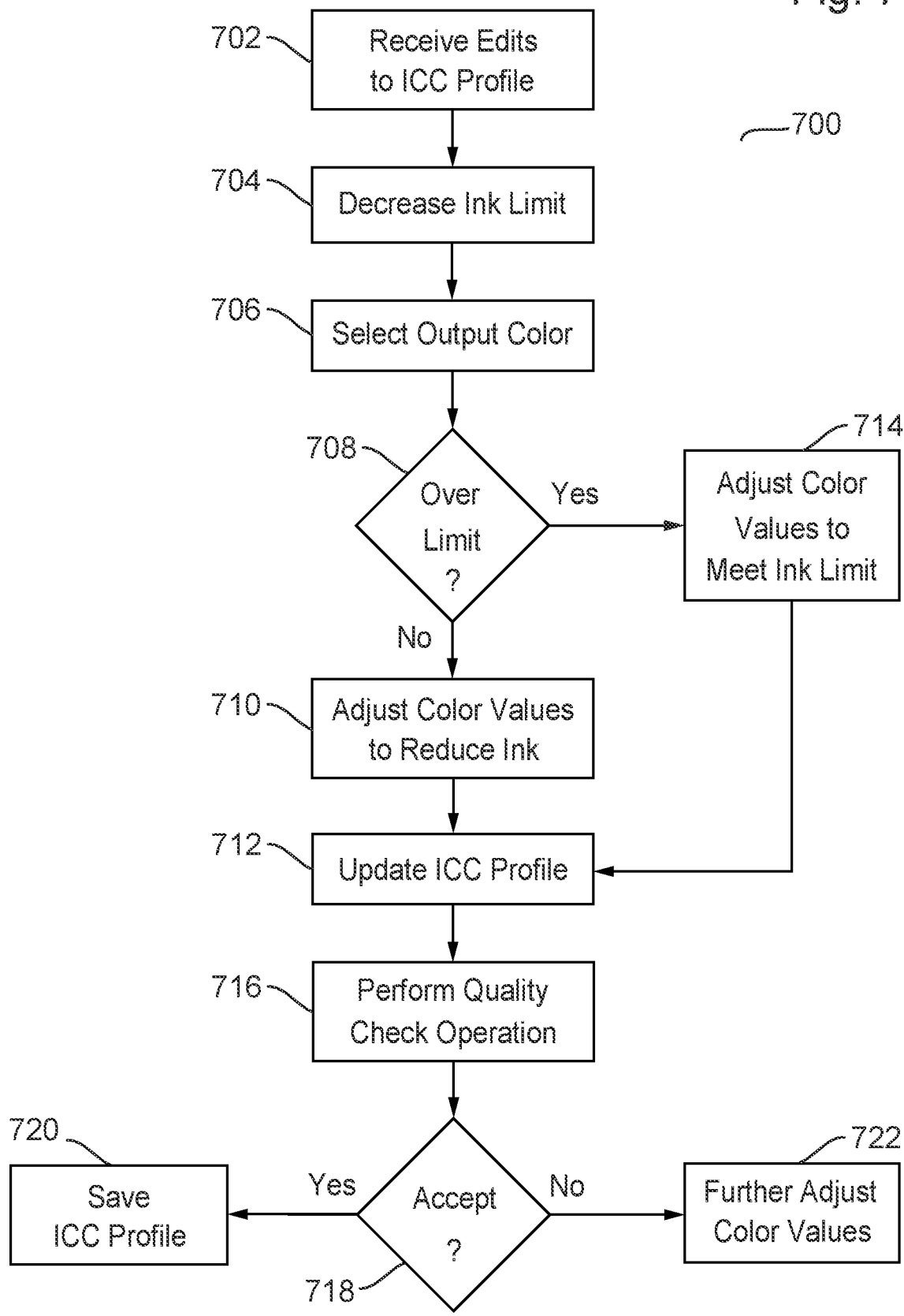
FIG. 7 illustrates a flowchart for decreasing the ink limit corresponding to an ICC profile according to the disclosed embodiments.

FIG. 7 depicts a flowchart 700 for decreasing an ink limit 506 corresponding to an ICC profile 157 according to the disclosed embodiments. Flowchart 700 refers to FIGS. 1-6 for illustrative purposes. Flowchart 700, however, is not limited by FIGS. 1-6.

Step 702 executes by receiving edits 508 to ink limit 506 to reduce or decrease the ink limit for ICC profile 157. As disclosed above, ink limit 506 may be expressed as a combination of percentages of the primary colors for a color. A decrease may reduce the acceptable ink limit for the combination, such as from 220% to 200%. Thus, step 704 executes by decreasing ink limit 506 by a specified amount.

Each output color associated with ICC profile 157 must be analyzed to determine if it meets the new ink limit 506. Step 706 executes by selecting one of the output colors printable using ICC profile 157. Color 518 is selected, which includes CMYK values 414 that are used to create the output color. As disclosed above, the percentages for the CMYK values are combined to determine whether color 518 exceeds the decreased ink limit. Step 708 executes by determining whether CMYK values 414 for color 518 exceed edited ink limit 506.

If step 708 is no, then the CMYK values are below decreased ink limit 506. Step 710 executes by adjusting CMYK values 414 that are under ink limit 506 to proportionally reduce the ink use in order to preserve smoothness in transition. Reduction amount 520 for CMYK values 414 may be based on smoothness parameter 522. Step 712 executes by updating ICC profile 157 to generate updated ICC profile 528.

If step 708 is yes, then the CMYK values are above decreased ink limit 506. Step 714 executes adjusting CMYK values 414 to meet ink limit 506. CMYK values 414 are adjusted incrementally to reduce the percentages in the primary colors until they are below decreased ink limit 506. Flowchart 700 proceeds to step 712. Steps 706-712 may be executed for all output colors provided by ICC profile 157. Updated ICC profile 528 includes the adjusted CMYK values for the colors.

Step 716 executes by performing quality check operation 550, as disclosed above in FIG. 5C. After performing the operation, it may determine whether any colors are distorted or any glitches occur based on quality metrics 554. Step 718 executes by determining whether any distortions or glitches are acceptable. If yes, then step 720 executes by saving updated ICC profile 528 at DFE 132. If step 718 is no, then step 722 executes by further adjusting CMYK values 414 for those colors that are not acceptable after adjustments for decreased ink limit 506. Alternatively, these CMYK values may be returned to their original CMYK values if the original values are below decreased ink limit 506.

Figure 8:
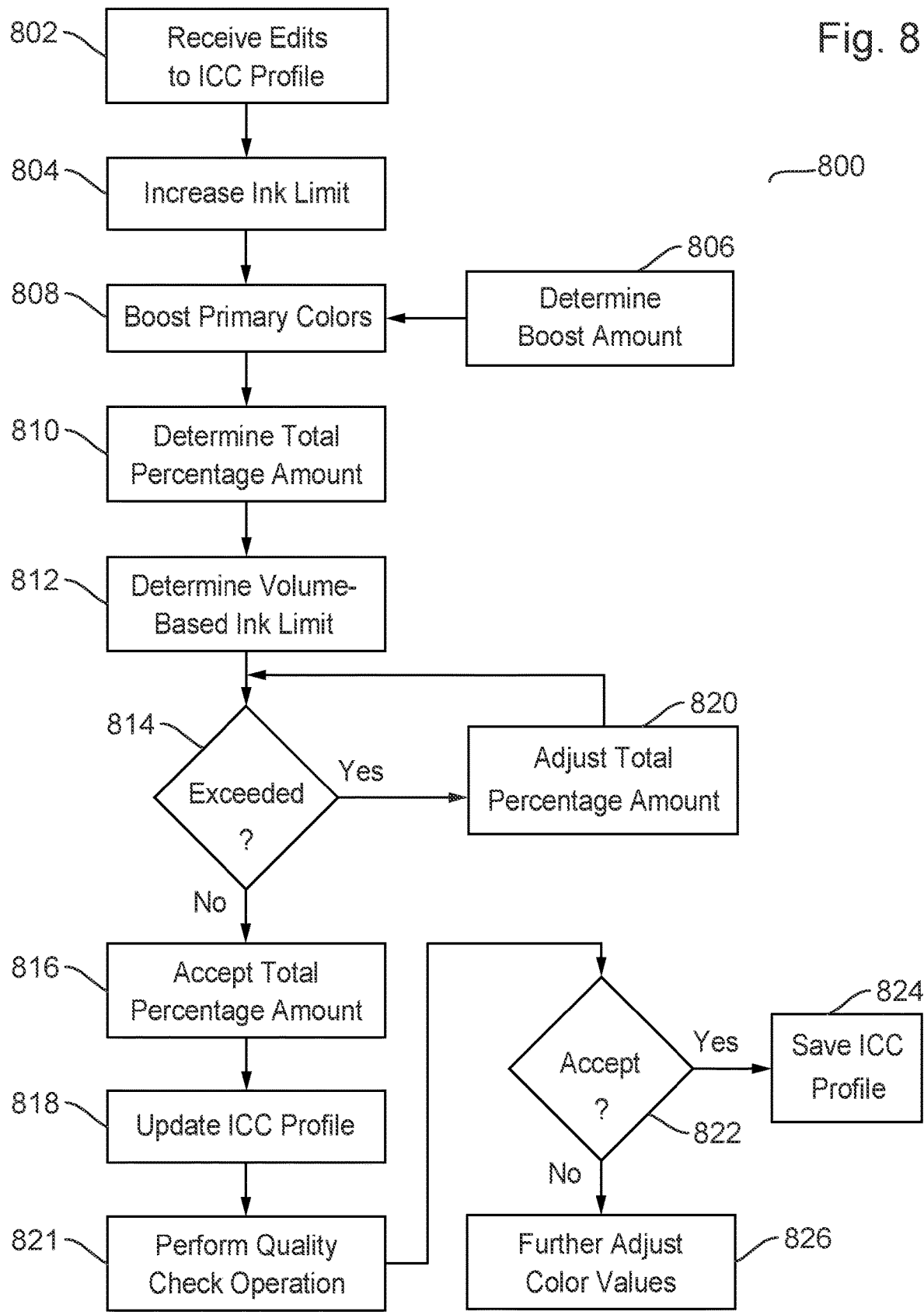
FIG. 8 illustrates a flowchart for increasing the ink limit corresponding to an ICC profile according to the disclosed embodiments.

FIG. 8 depicts a flowchart 800 for increasing ink limit 506 corresponding to ICC profile 157 according to the disclosed embodiments. Flowchart 800 refers to FIGS. 1-7 for illustrative purposes. Flowchart 800, however, is not limited by FIGS. 1-7.

Step 802 executes by receiving edits 508 to ICC profile 157. Step 802 corresponds to step 702 disclosed above, except edits 508 increase ink limit 506. Step 804 executes by increasing ink limit 506 with edits 508. Preferably, ink limit 506 is increased by a percentage amount, such as 10%, or from 200% to 220%.

Step 806 executes by determining a percentage amount to boost each CMYK value 414 for color 518. This percentage amount may be known as boost amount 524. Examples of boosting CMYK values 414 are disclosed above. Each primary color may be boosted an incremental amount based on the existing ink use of the color. Further, colors in the mid-tone or highlight portion of the color spectrum may be boosted a reduced amount based on their function in color printing. This amount may correspond to a lightness, or L*, value of the color signified in ICC profile 157.

Step 808 executes by boosting each of the primary colors of CMYK values 414 by boost, or percentage, amount 524. Using the example above, CMYK values 414 may be boosted by 10%, or from 80%, 80%, 40%, 0% to 88%, 88%, 44%, 0%. If color 518 corresponds to a certain lightness value, then CMYK values 414 may only be boosted by 5%, or to 84%, 84%, 42%, 0%, or they may not be boosted at all. The disclosed embodiments may specify how certain colors are to be treated according to their lightness value.

Step 810 executes by determining a total percentage amount 519 for boosted CMYK values 414. The total percentage amount is a combination of the CMYK values for color 518. Step 812 executes by determining a volume-based ink limit 330 for the specified media or according to ICC profile 157. Volume-based ink limit 330 is disclosed above and relates to the physical limit for applying ink in color printing operations.

Step 814 determines whether volume-based ink limit 330 is exceeded by total percentage amount 519 for the CMYK values for color 518. Using the example disclosed above, the boosted color amounts are totaled for a combination of the amounts, or total percentage amount 519. If no, then step 816 executes by accepting total percentage amount 519 and the boosted CMYK values for color 518. Step 818 executes by updating ICC profile 157 to eventually generated updated ICC profile 528.

If step 814 is yes, then total percentage amount 519 for color 518 exceeds volume-based ink limit 330. Step 820 executes by adjusting total percentage amount 519 to meet volume-based ink limit 330. As disclosed above, CMYK values 414 may be reduced incrementally until their combination meets the physical limit reflected by volume-based ink limit 330. After each incremental reduction, step 814 may be executed to determine if the reduced total percentage amount 519 results in exceeding volume-based ink limit 330. When an acceptable total percentage amount 519, or CMYK values 414, are determined then these values are accepted by step 816.

In some embodiments, step 814 also may determine whether any of CMYK values 414 exceeds 100%, which is the limit for a primary color's ink use. Using the examples disclosed above, if a primary color exceeds 100% after being boosted, then the disclosed embodiments may adjust CMYK values 414 back to their original amounts for color 518. Thus, step 820 may be executed to adjust CMYK values 414 back to their original total percentage amount 519. Other constraints 526 also may be applied in step 814 with step 820 resolving any color combinations that fail to meet the requirements set forth.

After generating updated ICC profile 818 with all color 518 along with any adjusted CMYK values 414, step 821 executes by performing a quality check operation 550 as disclosed above. Thus, step 822 executes by determining whether to accept any distortions or glitches as disclosed in step 718 in flowchart 700. If yes, then step 824 executes by saving updated ICC profile 528, as disclosed above in step 720. If step 822 is no, then step 826 executes by further adjusting CMYK value 414 to reduce or eliminate the distortions or glitches, as disclosed in step 722 in flowchart 700.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing an ICC profile, the method comprising:
   accessing the ICC profile at a printing device;
   parsing all destination tables associated with the ICC profile to determine an ink limit for a plurality of primary colors in the ICC profile;
   decreasing the ink limit for the plurality of primary colors corresponding to the ICC profile;
   adjusting a first color of the plurality of primary colors in the ICC profile that is over the decreased ink limit to meet the decreased ink limit;
   updating the ICC profile with the first color; and
   saving the updated ICC profile at the printing device.

2. The method of claim 1, further comprising updating CMYK values within at least one table with the adjusted first color.

3. The method of claim 1, further comprising selecting the ICC profile from a plurality of ICC profiles, wherein the plurality of ICC profiles are default ICC profiles based on a plurality of paper types.

4. The method of claim 3, wherein selecting the ICC profiled includes selecting the ICC profile according to one of the plurality of paper types.

5. The method of claim 1, further comprising performing a quality check operation of the updated ICC profile.

6. The method of claim 5, further comprising determining whether the updated ICC profile is acceptable according to the quality check operation.

7. The method of claim 1, wherein parsing all the tables associated with the ICC profile includes parsing all the tables associated with a destination ICC profile.

8. The method of claim 7, further comprising adjusting at least one second color of the plurality of primary colors in the ICC profile that is under the decreased ink limit to proportionally reduce ink use according to an ink limit smoothness parameter.

* * * * *